Oct. 6, 1970   E. C. RHYNE, JR   3,532,900
DC SQUELCH CIRCUIT
Filed Aug. 31, 1966   8 Sheets-Sheet 6
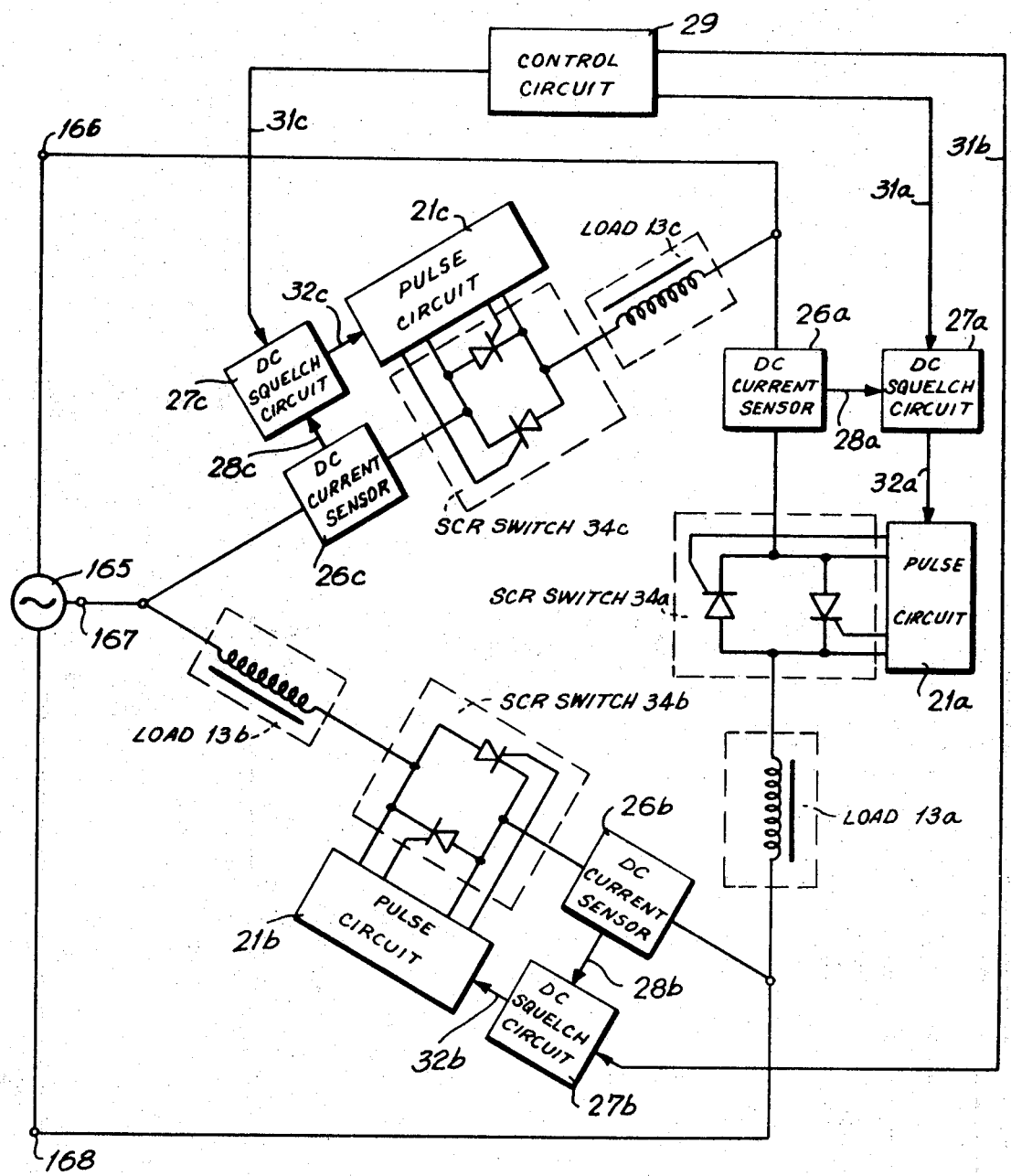
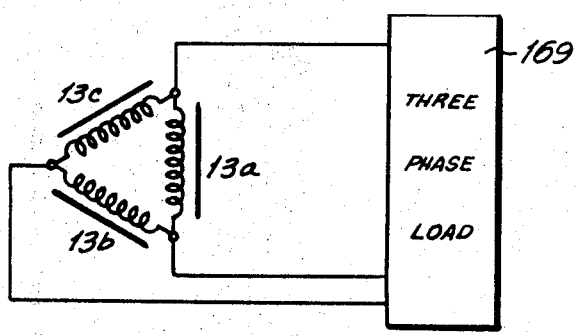
FIG.7

Oct. 6, 1970  E. C. RHYNE, JR  3,532,900
DC SQUELCH CIRCUIT
Filed Aug. 31, 1966  8 Sheets-Sheet 7
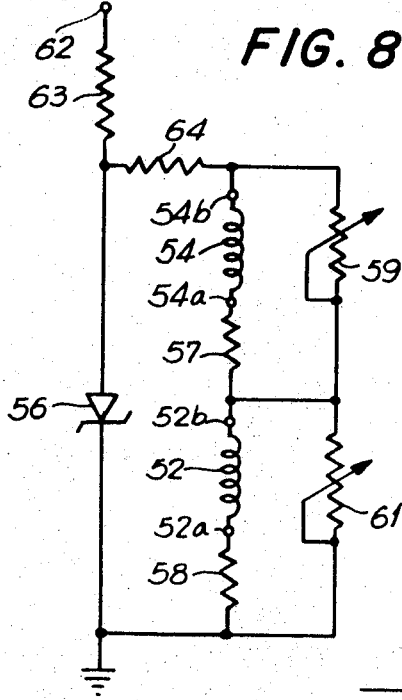
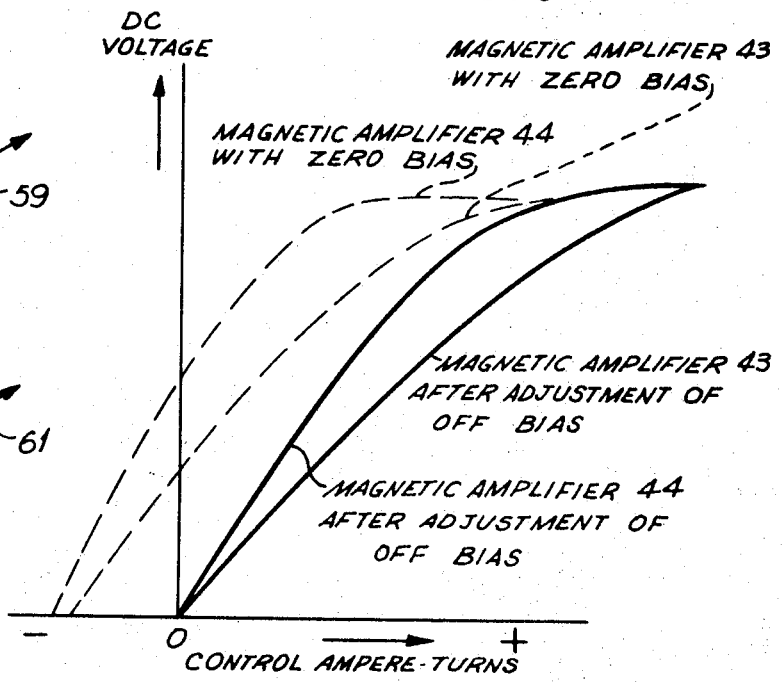
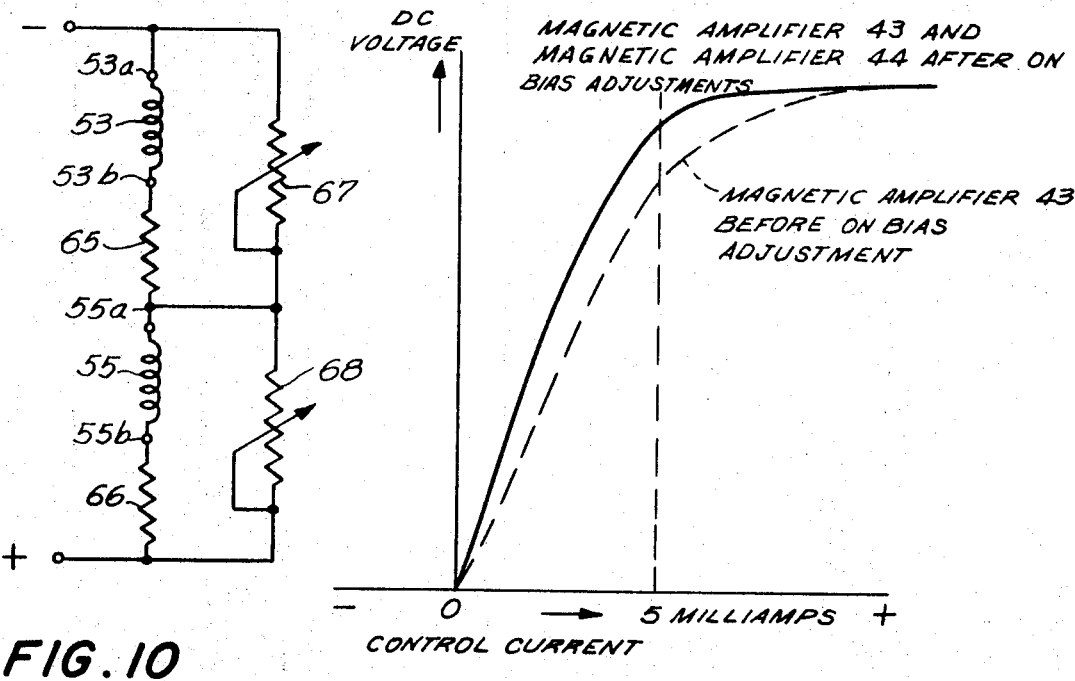

United States Patent Office 3,532,900
Patented Oct. 6, 1970

3,532,900
DC SQUELCH CIRCUIT
Earl C. Rhyne, Jr., Millis, Mass., assignor to Sola Basic Industries, Inc., Milwaukee, Wis., a corporation of Wisconsin
Filed Aug. 31, 1966, Ser. No. 576,450
Int. Cl. H03k 17/00; G05f 5/00
U.S. Cl. 307—252                12 Claims

ABSTRACT OF THE DISCLOSURE

Circuitry is provided in which DC is squelched in an AC circuit by controlling SCR's to fire at predetermined times in the AC cycles.

---

The present invention relates to a DC squelch circuit. More particularly, the invention relates to a DC squelch circuit in a circuit utilizing silicon controlled rectifiers to control an AC load.

In all types of circuits utilizing silicon controlled rectifiers or SCR's there has been an excessive incidence of SCR failure. The failures have occurred under many different operating conditions and in many cases the reason for the SCR failures has not been determined.

I have discovered that one important reason for SCR failure is the presence of DC currents in the line, and especially transient DC currents in the line. Large-amplitude transient DC currents can occur for such brief intervals of time that they damage the SCR's before they can be detected by the usual overload protection devices.

Steady state DC current of any magnitude in a circuit increases the RMS current and lowers the effective power factor. This increases the heating and overloading of the SCR's. The DC current component in the circuit contributes nothing to the load which is supplied through a transformer and, although it serves no useful purpose, it can cause SCR failures.

A silicon controlled rectifier or SCR may be utilized to provide a control function. Thus, for example, two SCR's may be utilized to control the current to a load. The load is normally an AC load but need not be an AC load. Each SCR has an anode, indicated by the triangular portion of the symbol for an SCR, a cathode, indicated by the bar portion of such symbol, and a control electrode or gate, indicated by a line extending from the bar portion of said symbol at an angle therewith. The control of the load current by the SCR's requires that the SCR's in turn be controlled. This is accomplished by controlling the supply of current to the gates of the SCR's so that the SCR's will fire at determined times and thereby be switched to their conductive conditions at determined times to conduct the AC current in the circuit to the load.

In a usual load current control circuit utilizing two SCR's, each SCR is fired by a pulse control circuit connected to its gate at a specific determined time or phase angle and is maintained in conductive condition for a specific determined portion of the cycle. However, one of the SCR's may not fire at the exact instant of time or phase angle at which it is desired to fire. This may be due to variations in manufacture of the SCR or the pulsing circuit which lead to varying characteristics or operation of the SCR. Because one of the SCR's fails to fire at the exact desired instant, a resultant DC current may be generated in the circuit and may result in SCR failure because of excessive rate of change of current ($dI/dt$) or excessive RMS current in one of the SCR's.

Even with identical SCR's and with identical firing pulses displaced exactly 180°, it ispossible to generate DC currents in an AC circuit if even harmonics are present in the AC source voltage. Because the average voltages during the two half-cycle conducting intervals are not the same, a resultant DC voltage exists. When two back-to-back SCR's are controlling the power supplied to a transformer primary winding, a very large DC current can result from a relatively small resultant DC voltage since the DC current is limited only by the DC resistance of the transformer winding and the AC voltage source. If the SCR's were controlling a resistive load, without a transformer, the DC current would be limited by the resistance of the load and the AC voltage source. For example, in a circuit with a normal RMS current of 50 amperes, transient DC currents exceeding 2000 amperes peak have been observed.

Unmatched AC coil leakages, unmatched cores, unbalanced DC ampere-turns or harmonics in the AC supply voltage, especially second harmonics, result in deferential firing of a pulse magnetic amplifier. When the magnetic amplifier is connected in the SCR circuit such deferential firing is undesirable because it also can produce a resultant DC voltage in the AC power system. In a high-power circuit, this effect is enhanced considerably in a circuit utilizing efficient power transformer cores such as, for example, toroidal cores or distributed gap cores such as the Wescor of Westinghouse Electric Corporation.

The principal object of the present invention is to provide a new and improved DC squelch circuit.

An object of the present invention is to provide a circuit for protecting a silicon controlled rectifier from damage resulting from DC current.

Another object of the present invention is to provide a circuit for protecting a silicon controlled rectifier from short-circuit damage.

Another object of the present invention is to provide a circuit for squelching DC in a circuit comprising a silicon controlled rectifier without disrupting the normal control operation of the silicon controlled rectifier in the circuit.

In accordance with the present invention, DC current in a circuit including an SCR or SCR's is squelched or suppressed regardless of its cause or origin. During the squelching of the DC current, the SCR or SCR's provide their normal control function in the circuit and upon such squelching, the SCR or SCR's may be utilized with any modern distributed gap core without difficulty.

In accordance with the present invention, a DC current in a circuit utilizing SCR's is detected or sensed in magnitude and in polarity or direction of flow and the presence, magnitude and flow direction of the DC current are then utilized to squelch the DC current by eliminating the effect of improper firing of the SCR's in producing the DC current. Since the DC current is, in most cases, due to imbalance of the SCR's or the presence of harmonics, especially even harmonics, in the circuit, the control of the firing of the SCR's is modified, in accordance with the present invention, to squelch or suppress the DC current in the circuit.

In order that the present invention may be readily carried into effect, it will now be described with reference to the accompanying drawings, wherein:

FIG. 7 is a block diagram of a three-phase DC squelch circuit system utilizing the embodiment of FIG. 1;

FIG. 8 is a circuit diagram of an embodiment of a balancing circuit for the magnetic amplifiers of the embodiment of FIG. 3;

FIG. 9 is a graphical illustration of the operation of the embodiment of FIG. 8;

FIG. 10 is a circuit diagram of a preferred embodiment of a further balancing circuit for the magnetic amplifiers of the embodiment of FIG. 3;

FIG. 11 is a graphical illustration of the operation of the embodiment of FIG. 10;

In the figures, the same components are identified by the same reference numerals.

Figure 1:
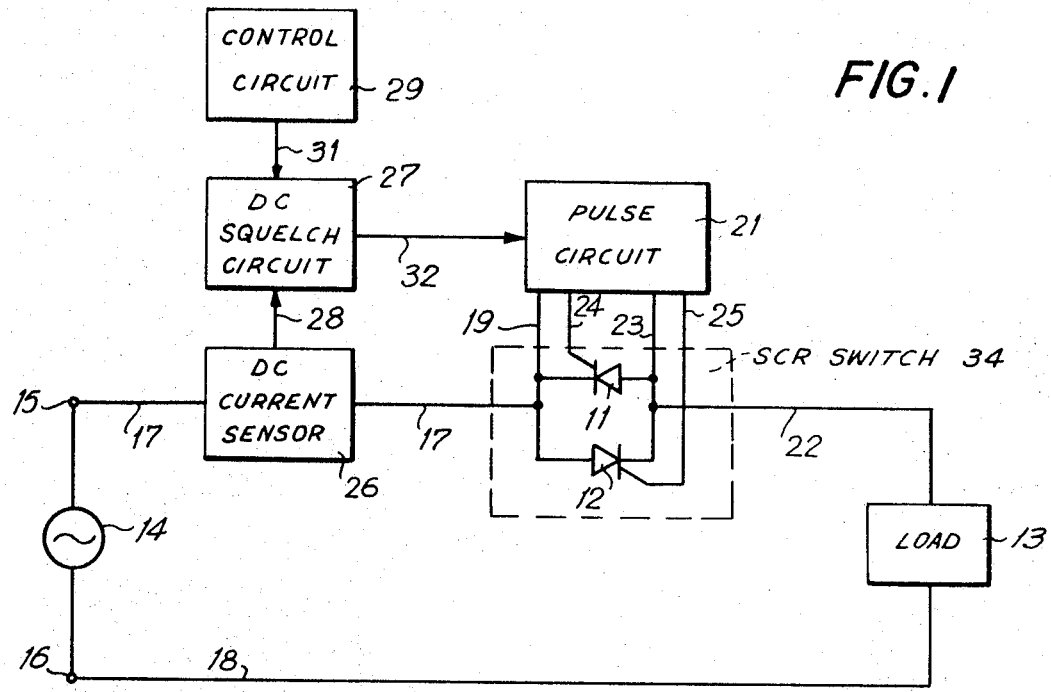
FIG. 1 is a block diagram of an embodiment of the DC squelch circuit of the present invention.

In FIG. 1, a first SCR 11 and a second SCR 12 are connected in a circuit and function to control the supply of current to a load 13 from an AC voltage source 14 which provides an AC voltage and applies to input terminals 15 and 16 of lines 17 and 18, respectively, of the circuit. The cathode of the first SCR 11 is connected to the line 17 and to control line 19 from a pulse circuit 21. The anode of the first SCR 11 is connected to the load 13 via a line 22 and to a control line 23 from the pulse circuit 21. The gate of the first SCR is connected to the pulse circuit 21 via a control line 24.

The cathode of the second SCR 12 is connected to the load 13 via the line 22 and to the control line 23. The anode of the second SCR 12 is connected to the line 17 and to the control line 19. The gate of the second SCR is connected to the pulse circuit 21 via a control line 25. The circuit of FIG. 1 functions to sense or detect the presence and direction of flow of the DC current and then utilizes such information to control the operation or firing of the SCR's 11 and 12 thereby squelching said DC current. This is accomplished by a DC current sensor or detector 26 which indicates the presence and direction of flow of the DC current in the line 17. The DC current sensor 26 is connected directly in the AC line 17 feeding the load 13 via the SCR's 11 and 12. This is the case only in the specific embodiment of FIG. 1. The DC current sensor 26 need not be connected directly in the line 17, because it may comprise, for example, a Hall effect device in which the sensing may be through magnetic fields where the device does not have to be connected directly in the line. The DC current sensor 26 may comprise any suitable means for detecting the magnitude and direction of flow of DC current and may comprise any suitable electrical or magnetic means.

A DC squelch circuit 27 is connected to the DC current sensor 26 via a line 28 and a control circuit 29 is connected to said DC squelch circuit via a line 31. The DC squelch circuit 27 utilizes the information sensed by the DC current sensor 26 to modify the normal control of the first and second SCR's 11 and 12 by the control circuit 29. The DC squelch circuit 27 is connected to the pulse circuit 21 via line 32. Normally, the control circuit 29 controls the firing of the SCR's 11 and 12, and under ideal conditions, the SCR's would fire, as desired. That is, each of the SCR's 11 and 12 fires at the start of its allotted half cycle. The DC squelch circuit 27 modifies the points or phase angles at which each of the SCR's fires to compensate for distortion in the firing of the SCR's, as previously discussed herein.

The presence of DC current in the circuit is squelched or suppressed by controlling the firing points or phase angles of the SCR's in the following manner. If, for example, the second SCR 12 fires early in its half cycle, it conducts more current than it would under proper operating conditions, and the first SCR 11 conducts less current in its half cycle than it should under normal operating conditions because it fires at a later point or phase angle in its half cycle than it normally would. In such circumstances, the DC squelch circuit 27 and the pulse circuit 21 cooperate to fire the second SCR 12 at a later point in its half cycle and to fire the first SCR 11 at an earlier point in its half cycle to correct the improper firing times of the SCR's. If the first SCR 11 fires at a point earlier in its half cycle than it should, it conducts more current than it would under proper operating conditions, and the second SCR 12 conducts less current in its half cycle than it should under normal operating conditions because it fires at a later point in its half cycle than it normally would. In such circumstances, the DC squelch circuit 27 and the pulse circuit 21 cooperate to retard the firing point of the first SCR 11 and advance the firing point of the second SCR 12.

An advantage of great importance of the DC squelch circuit of the present invention is that it thus does not interfere with the normal operation of the circuit for controlling the current supplied to the load. The normal operation of the SCR circuit continues as before with the addition of the control function of the circuit of the present invention to prevent the undesirable destruction of the SCR's. Since the circuit of the present invention adjusts differences in firing times of the SCR's, said circuit has a great range of application to all types of circuitry and circuitry which heretofore could not utilize SCR's because of the fact that the SCR's were so heavily and easily damaged by DC current in the circuit.

Figure 2:
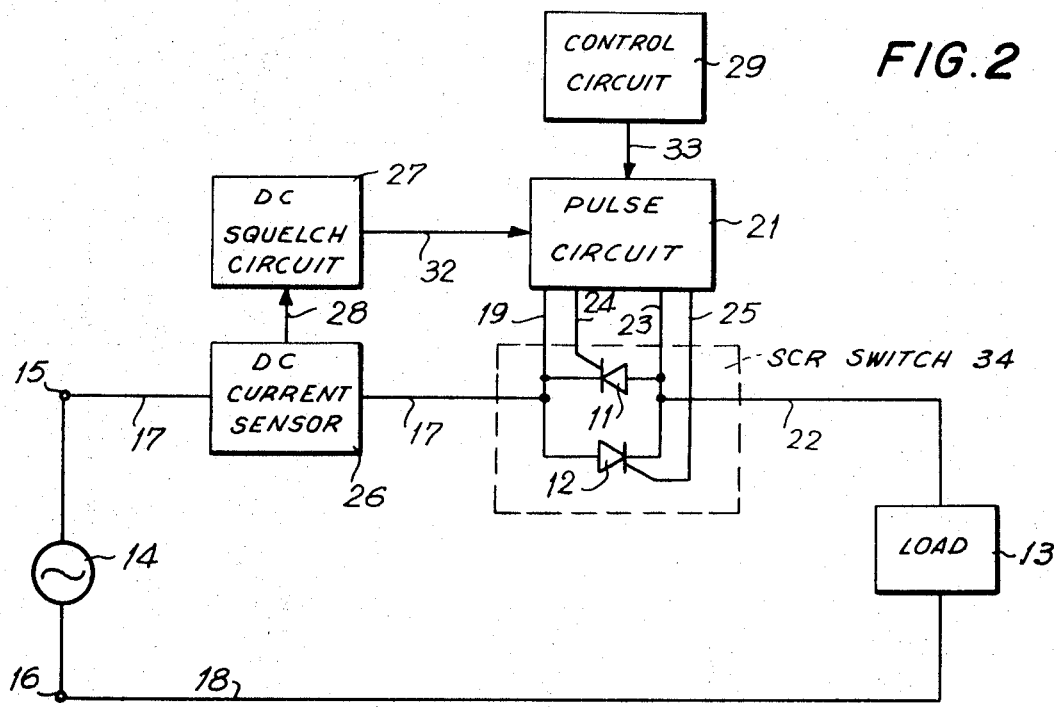
FIG. 2 is a block diagram of a modification of the embodiment of FIG. 1.

FIG. 2 is a modification of FIG. 1 which functions in essentially the same manner as the embodiment of FIG. 1. In FIG. 2, the control circuit 29 is connected to the pulse circuit 21 via a line 33. Otherwise, the embodiments of FIGS. 1 and 2 are the same. In FIGS. 1 and 2, the first and second SCR's 11 and 12 are connected together in the described manner and function as an SCR switch 34.

Figure 3:
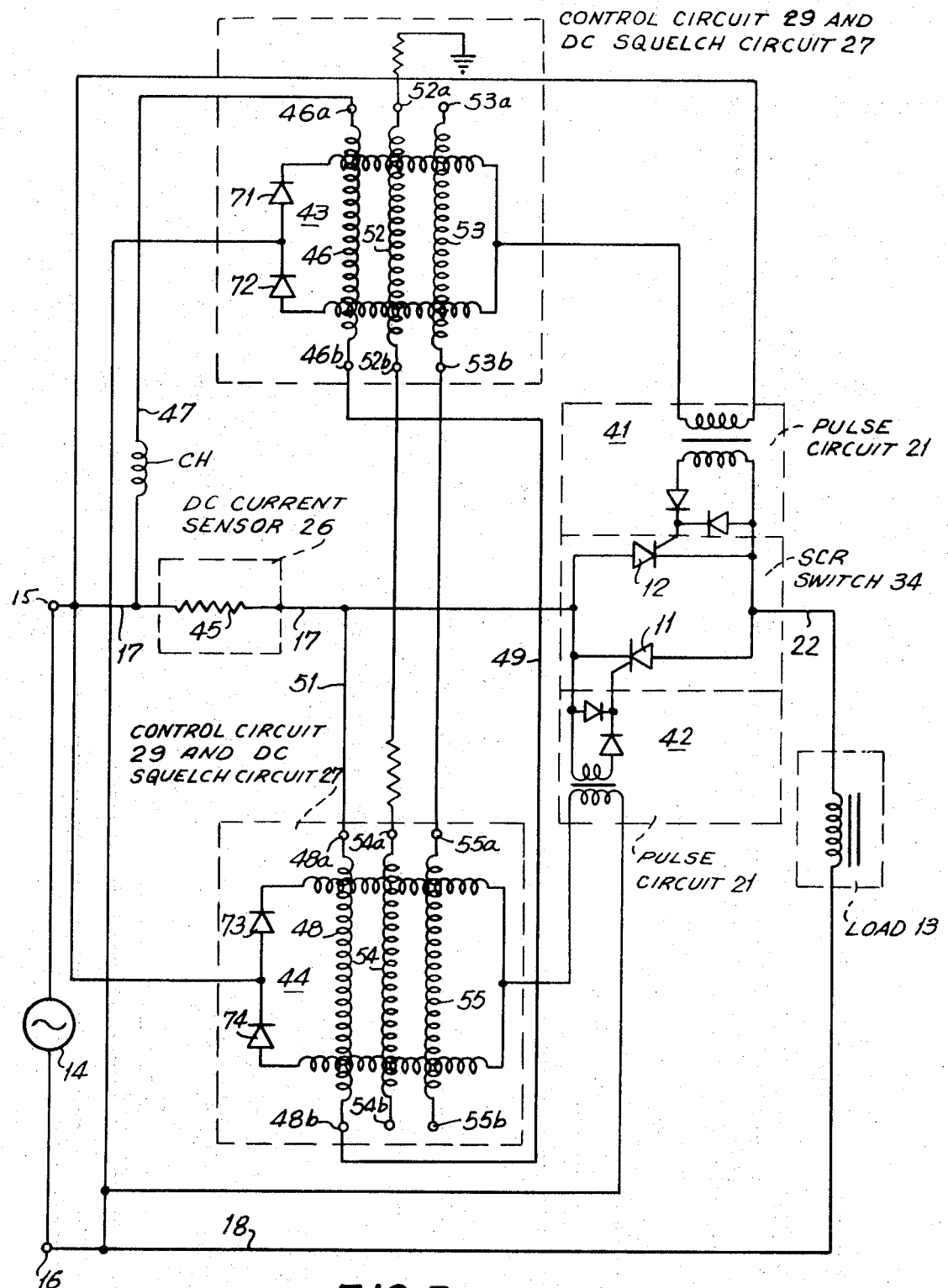
FIG. 3 is a circuit diagram of the embodiment of FIG. 1.

FIG. 3 is a circuit which may be used as the embodiment of FIG. 1. In FIG. 3, the first and second SCR's 11 and 12, respectively, conduct current through the line 17 in opposite half cycles. Each of the SCR's is pulsed by its own separate pulse transformer. Thus, the second SCR 12 is pulsed by pulse transformer 41 and the first SCR 11 is pulsed by pulse transformer 42. The pulse transformers 41 and 42 are energized by means of separate and distinct magnetic amplifiers 43 and 44, which comprise the control circuit 29 and DC squelch circuit 27. The magnetic amplifiers permit separate control of the pulses supplied to the gate of each of the SCR's.

The magnetic amplifiers 43 and 44 may comprise any suitable type for pulsing SCR's. In addition, cheaper magnetic amplifier materials, which do not require such sharp pulse definition, may be utilized, since the DC squelch circuit of the present invention itself will control the points at which the SCR's fire. The DC current sensor 26 may comprise a resistor 45 connected in series with the AC line 17, which current is supplied to the load 13 under the control of the SCR's 11 and 12.

For explanatory purposes, it is assumed that there is an unbalance in the SCR switch 34 because the second SCR 12 conducts more current during its half cycle than the first SCR 11 conducts during its half cycle. An equivalent DC current flows from the AC source 14 via the input terminals 15 and 16 and appears as an equivalent DC voltage wherein the input terminal 15 is positive in polarity. The residual DC current generates a DC resultant voltage across the resistor 45 which is such that the input terminal 15 side of said resistor has a positive polarity.

The voltage, both AC and DC, which is developed across the resistor 45, is applied to windings of each of the magnetic amplifiers 43 and 44 in series. That is, the input terminal 15 side of the resistor 45 is connected to a winding 46 via a winding terminal 46a of the magnetic amplifier 43 via a line 47. The other winding terminal 46b of the winding 46 of the magnetic amplifier 43 is connected to the other winding terminal 48b of a winding 48 of the magnetic amplifier 44 via a line 49. The negative side of the sensor resistor 45 is connected to the winding terminal 48a of the winding 48 of the magnetic amplifier 44 via a line 51. Thus, the DC voltage which is generated across the resistor 45 flows from the positive side to the terminal 46a of the magnetic amplifier 43, through the winding 46, from the terminal 46b to the terminal 48b of the magnetic amplifier 44, through the winding 48, and from the terminal 48a to the negative side of the resistor 45.

A choke CH is connected in the line 47 of FIG. 3 and functions to filter AC out of the cores of the magnetic amplifiers.

The magnetic amplifiers 43 and 44 are provided with polarities which are such that current flow into the "a" winding terminals will retard the firing angle and cause the magnetic amplifier to fire later in the half cycle, and current flow into the "b" winding terminals will advance the firing angle and cause the magnetic amplifier to fire earlier in the half cycle. Thus, the resultant or DC voltage, which was produced, in the selected explanatory example, because the second SCR 12 conducted more current during its half cycle, has a resultant effect on the magnetic amplifier 43 of retarding its firing angle and on the magnetic amplifier 44 of advancing its firing angle. This in turn reduces the amount of current which is conducted during the half cycle during which the second SCR 12 is conductive and increases the amount of current which is conducted during the half cycle during which the first SCR 11 is conductive, thus eliminating the DC resultant current flowing.

A self-saturating magnetic amplifier is a highly preferred and suitable component of the circuit of FIG. 3, since it does not respond to a great extent to the vary large AC voltages which are applied with the DC voltages to its windings. The winding 46 and the winding 48 function solely as the DC squelch circuit 27 and the other two windings of each of the magnetic amplifiers function somewhat as filters and comprise the control circuit 29. The cores of the magnetic amplifiers are relatively immune to the effects of the AC currents which flow. Thus the self-saturating magnetic amplifier is particularly suitable for sorting out that portion of the AC line current which is the DC component.

The magnetic amplifier 43 comprises a first control winding 52 having winding terminals 52a and 52b and a second control winding 53 having winding terminals 53a and 53b. The magnetic amplifier 44 comprises a first control winding 54 having winding terminals 54a and 54b and a second control winding 55 having winding terminals 55a and 55b. The control windings 52, 53, 54 and 55 function to control the firing of the SCR's 11 and 12 to control the supply of current to the load 13.

In a preferred embodiment of the present invention, it is desirable that the operating condition of the magnetic amplifiers 43 and 44 be well balanced so that the DC squelch circuit 27 has as little to do as possible. Thus, in FIG. 8 which is an embodiment of a balancing circuit for the magnetic amplifiers 43 and 44, the first control windings 54 and 52 of the magnetic amplifiers 43 and 44 are connected in series across a Zener diode 56. A resistor 57 is connected in series with the winding 54 and a resistor 58 is connected in series with the winding 52. A potentiometer 59 is connected across the series connection of the winding 54 and the resistor 57 and a potentiometer 61 is connected across the series connection of the winding 52 and the resistor 58.

In FIG. 8, a DC voltage supply source provides a negative DC voltage of 50 volts at a voltage supply terminal 62. A resistor 63 limits the magnitude of the total current which flows to the Zener diode 56 from the voltage supply terminal 62. A resistor 64 limits the magnitude of the total current which flows through the windings 54 and 52 and the potentiometers 59 and 61. The current flow through the windings 54 and 52 is of a polarity such that the current flows into an "a" winding terminal and thus desaturates the magnetic amplifier and tends to cause it to fire at the end of the half cycle. The two potentiometers 59 and 61 adjust the off bias of the two magnetic amplifiers in such a manner that both magnetic amplifiers are exactly off when no other control ampere turns are supplied to the magnetic amplifier. This is illustrated in FIG. 9. The Zener diode 56 functions to stabilize the adjustment so that it remains constant.

FIG. 9 illustrates the identical adjustment of the off bias of the two magnetic amplifiers 43 and 44, although the magnetic amplifiers do not necessarily turn on or fire at the same time with the input control current.

FIG. 10 is a circuit diagram of a preferred embodiment of a further balancing circuit for the magnetic amplifiers 43 and 44. In FIG. 10, the normal control current supplied from any control or regulating circuit energizes the magnetic amplifiers 43 and 44. FIG. 11 is a graphical illustration of the operation of the embodiment of FIG. 10. In FIG. 10, the second control windings 53 and 54 of the magnetic amplifiers are connected in series with each other. A resistor 65 is connected in series with the winding 53 and a resistor 66 is connected in series with the winding 55. A potentiometer 67 is connected across the series connection of the winding 53 and the resistor 65 and a potentiometer 68 is connected across the series connection of the winding 55 and the resistor 66.

In FIG. 10, the potentiometers 67 and 68 function to adjust the on bias of the magnetic amplifiers 43 and 44 so that for a determined amount of control circuit current such as, for example, 5 milliamps, the two magnetic amplifiers will be on or fire together and will be in phase with each other. This will be so although the current flowing through the winding 53 of the magnetic amplifier 43 may not be equal to the current flowing through the winding 55 of the magnetic amplifier 44. Thus, by adjustment of the on and off bias, the two magnetic amplifiers turn off together and turn on together and essentially track together for a common control current.

When properly adjusted in accordance with these figures, the DC squelch system has a minimum amount of work to do. It is also much more capable of coping with DC currents caused by transients, since it has so little corrective current to apply for a given amount of DC. Since the squelch circuit can do a great deal of work in correcting for dissimilar magnetic pulsing, it is not necessary, in the present invention, that the two magnetic amplifiers 43 and 44 be made to track. However, it is highly desirable that the magnetic amplifiers do track, in accordance with the present invention, to enable the squelch circuit to cope with the greatest possible differences that can ever occur.

The magnetic amplifier 43 includes the usual self-saturating rectifier diodes 71 and 72 and the magnetic amplifier 44 includes the usual self-saturating rectifier diodes 73 and 74.

Figure 4:
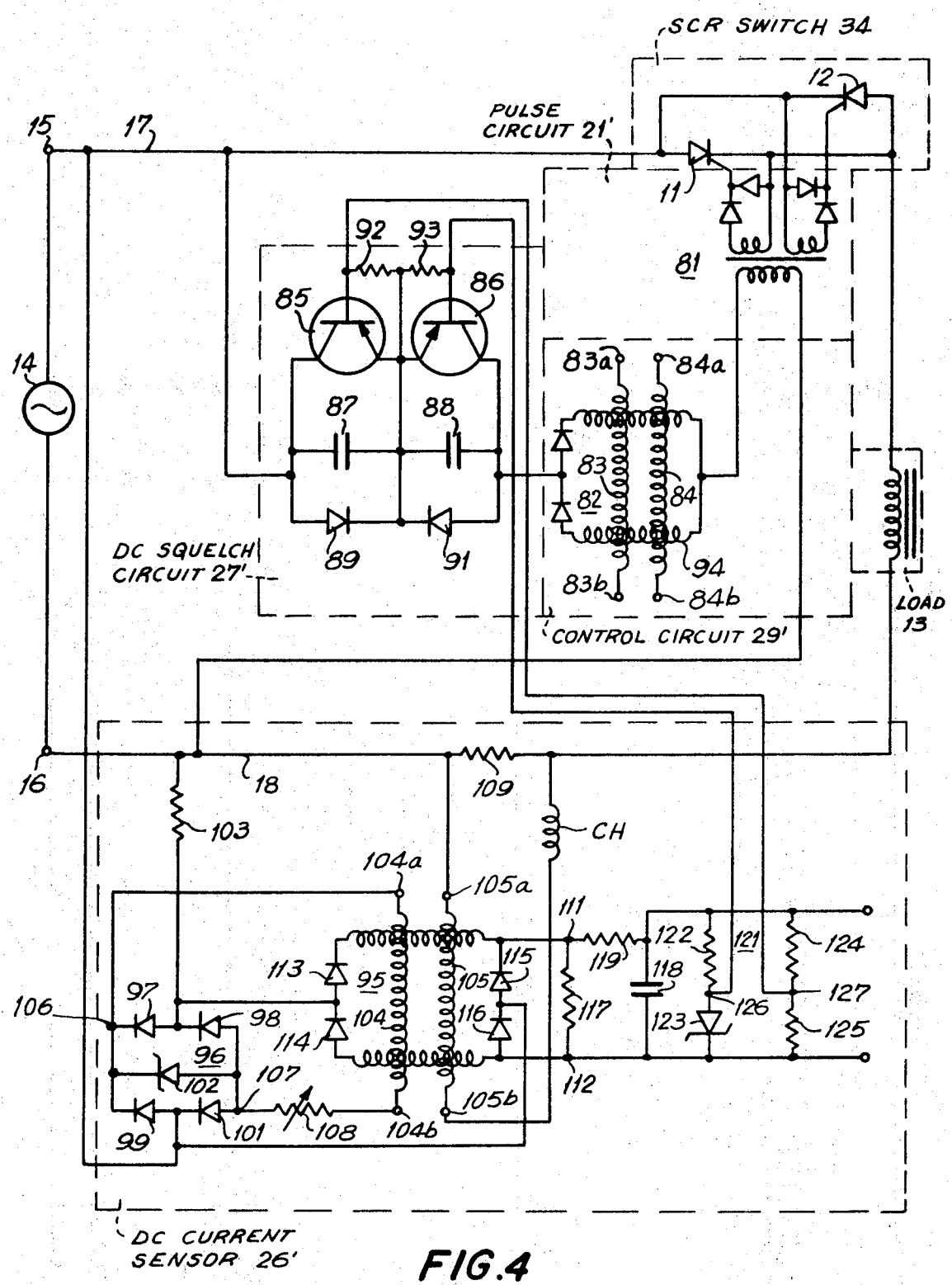
FIG. 4 is a circuit diagram of another emodiment of the DC squelch circuit of the present invention.

FIG. 4 is another embodiment of the DC squelch circuit of the present invention. In the embodiment of FIG. 4, both control rectifiers 11 and 12 are fired by a single pulse transformer 81 which in turn is controlled by single magnetic amplifier 82. There is no winding equivalent to the winding 46 of the magnetic amplifier 43 or equivalent to the winding 48 of the magnetic amplifier 44 of FIG. 3, in the magnetic amplifier 82 of FIG. 4, since the DC squelch circuit is not included in the magnetic amplifier 82, as it is in the magnetic amplifiers 43 and 44. The magnetic amplifier 82 functions as the control circuit 29' and comprises a first control winding 83 having winding terminals 83a and 83b and a second control winding 84 having winding terminals 84a and 84b. The first and second windings 83 and 84 may function in the same manner as the first and second control windings 52 and 53 of the magnetic amplifier 43 or the first and second control windings 54 and 55 of the magnetic amplifier 44 of FIG. 3. That is, the first control winding 83 may be utilized to bias the magnetic amplifier 82 completely off and the second control winding 84 may be utilized to turn said magnetic amplifier on in accordance with regulating or other control currents.

Normally, in a pulse circuit of the type of FIG. 4, the magnetic amplifier 82 and the pulse transformer 81 would be connected directly to the AC source 14, which supplies the pulsing energy via the input terminals 15 and 16. In the embodiment of FIG. 4, however, a separate DC squelch circuit 27' is connected between the line 17 and the magnetic amplifier 82. The DC squelch circuit 27' functions in cooperation with a DC current sensor 26' which senses the DC current.

The DC squelch circuit 27' comprises a first transistor 85 and a second transistor 86, each having an emitter electrode, a base electrode and a collector electrode. The transistors 85 and 86 are utilized to determine the magnitude of charge on capacitors 87 and 88, respectively. In the DC squelch circuit 27', a diode 89 is connected in a closed loop with the emitter-collector path of the first transistor 85. The capacitor 87 is also connected in a closed loop with the emitter-collector path of the first transistor 85. A resistor 92 is connected in a closed loop with the emitter-base path of the first transistor 85. A diode 91 is connected in a closed loop with the emitter-collector path of the second transistor 86. The capacitor 88 is also connected in a closed loop with the emitter-collector path of the second transistor 86. A resistor 93 is connected in a closed loop with the emitter-base path of the second transistor 86.

The emitter electrode of the first transistor 85 is directly connected to the emitter electrode of the second transistor 86. The base electrodes of the transistors 85 and 86 are connected to each other via the resistors 92 and 93 connected in series. The collector electrode of the first transistor 85 is connected to the collector electrode of the second transistor 86 via the series connection of the capacitors 87 and 88. The anode of the diode 89 is directly connected to the collector electrode of the first transistor 85 and the cathode of said diode is directly connected to the emitter electrode of said transistor. The anode of the diode 91 is directly connected to the collector electrode of the second transistor 86 and the cathode of said diode is directly connected to the emitter electrode of said transistor.

The diodes 89 and 91 direct the current flow in the capacitors 87 and 88, respectively, in accordance with the particular half cycles that they are associated with. If it is assumed that the first transistor 85 is turned completely on or is in its conductive condition, and if it is also assumed that the input terminal 15 has a positive polarity in that particular half cycle, then the current flows through the diode 89 and through the capacitor 88, since the diode 91 is then in blocking condition and the second transistor 86 is then turned off or is in its nonconductive condition. The current flow through the diode 89 and the capacitor 88 produces a voltage across the capacitor 88 which has a positive polarity at the common point on the line connecting the diodes 89 and 91. Since the first transistor 85 is bypassed by the diode 89 none of the diode 89, the capacitor 87 and said first transistor provides a voltage or impedance restriction to the flow of current.

In the next half cycle, when the input terminal 16 has a positive polarity, the current flows through the pulse transformer 81, the winding 94 of the magnetic amplifier 82, and the capacitor 88. Since the capacitor 88 then has a polarity which aids the voltage supplied to the input terminals 15 and 16, said capacitor biases the diode 91 to its blocking condition, so that the current flows through the capacitor 88 instead of through the diode 91. This cause and effect adds the voltage of the capacitor 88 to that particular half cycle of voltage and thereby advances the point of firing of the magnetic amplifier 82; said magnetic amplifier being fired when the input terminal 16 is positive. The assumed condition would thus lead to an advance of the firing point of the silicon controlled rectifier 12.

When the second transistor 86 is turned on or is in its conductive condition, and the first transistor 85 is turned off or is in its non-conductive condition, a voltage is developed across the capacitor 87 and adds voltage to the half cycle in which the input terminal 15 is positive to thereby advance the firing point of the silicon controlled rectifier 11. Therefore, depending upon the conduction condition of transistors 85 and 86, voltage may be added to either of the half cycles in order to advance or retard the firing times, points or angles of the SCR's 11 and 12 and thereby eliminate DC current which appears in the circuit.

The DC current must first be determined and applied to the base electrodes of the transistors 85 and 86 in such a manner as to suppress the DC. This may be accomplished in any suitable manner in which a DC voltage is made proportional to the DC current in the circuit. In the embodiment of FIG. 4, the DC voltage is sensed by the DC current sensor 26' which comprises a second magnetic amplifier 95.

The AC supply voltage for the magnetic amplifier 95 is provided by a Zener diode rectifier bridge circuit 96 which stabilizes and clamps the voltage across it. The rectifier bridge circuit 96 comprises diodes 97, 98, 99 and 101 and a Zener diode 102. The rectifier bridge circuit 96 produces a square wave AC voltage for the magnetic amplifier 95. A resistor 103 is connected between the supply line 18 and the bridge circuit 96 and the magnetic amplifier 95 and functions to limit the current through said bridge circuit and said magnetic amplifier. The magnetic amplifier 95 comprises a first winding 104 having winding terminals 104a and 104b and a second winding 105 having winding terminals 105a and 105b. The first winding 104 of the magnetic amplifier 95 is connected to the DC output terminals 106 and 107 of the rectifier bridge circuit 96.

A variable resistor 108 is connected between the output terminal 107 of the bridge circuit 96 and the winding terminal 104b of the first winding 104 of the magnetic amplifier 95. The variable resistor 108 functions as a null adjustment for the DC current sensor. The second winding 105 of the magnetic amplifier 95 is connected directly across a DC current sensing resistor 109 which is connected in the supply line 18. In a manner similar to that hereinbefore described, the magnetic amplifier 95 is insensitive to the AC current flowing through the resistor 109, but responds directly to the DC current flowing through said resistor.

A choke CH is connected between the winding terminal 105b and the DC current sensing resistor 109 of FIG. 4 and functions to filter AC out of the cores of the magnetic amplifier 95.

The current through the first winding 104 of the magnetic amplifier 95 is such that said magnetic amplifier is normally half on, thereby permitting current of one polarity to cause an increase in the output of said magnetic amplifier and permitting current of the other polarity to cause a decrease in the output of said magnetic amplifier. The magnetic amplifier 95 produces a DC output voltage at output terminals 111 and 112. The magnetic amplifier 95 comprises the usual self-saturating rectifier diodes 113 and 114 and diodes 115 and 116, which function as rectifiers to produce a DC voltage across the output terminals 111 and 112 with a positive polarity at the output terminal 111.

A bleeder resistor 117 is connected between the output terminals 111 and 112 of the magnetic amplifier 95 and provides a circulating path for the exciting current and permits the utilization of cheaper iron in said magnetic amplifier. A capacitor 118 is connected across the bleeder resistor 117 via a resistor 119 and the resistor 119 and capacitor 118 function as an RC filter for the output voltage of the magnetic amplifier 95. An output bridge 121 connected to the output of the filter 118, 119 comprises a resistor 122 connected in series with a Zener diode 123 to form one leg thereof and a resistor 124 connected in series with a resistor 125 to form another leg thereof.

Each of the legs 122, 123 and 124, 125 is connected across the capacitor 118. Under normal operating conditions, there will be, for example, 5 volts across the Zener diode 123, 5 volts across the resistor 122, 5 volts across the resistor 124 and 5 volts across the resistor 125, providing a resultant voltage across terminals 126 and 127 of zero. This is the null condition for the sensor 26'.

When the resistor 109 of the DC current sensor 26' has a positive polarity of DC current at its end connected to the winding terminals 105b of the winding 105 of the magnetic amplifier 95, the magnetic amplifier turns on more. The voltage across the capacitor 118 increases and unbalances the output bridge 121, making the terminal 127 more positive than the terminal 126. This in turn provides a voltage to the base electrodes of the transistors 85 and 86. Since the voltage applied to the base electrode of the transistor 86 is negative, said transistor 86 is turned on or made conductive. Since the voltage applied to the base electrode of the transistor 85 is positive, said transistor 85 is turned off or made non-conductive. This causes an advance in the firing time, point or angle of the SCR 12 and a retardation in the firing time, point or angle of the SCR 11 to squelch the DC voltage of this polarity appearing across the resistor 109 of the DC current sensor 26'.

Figure 12:
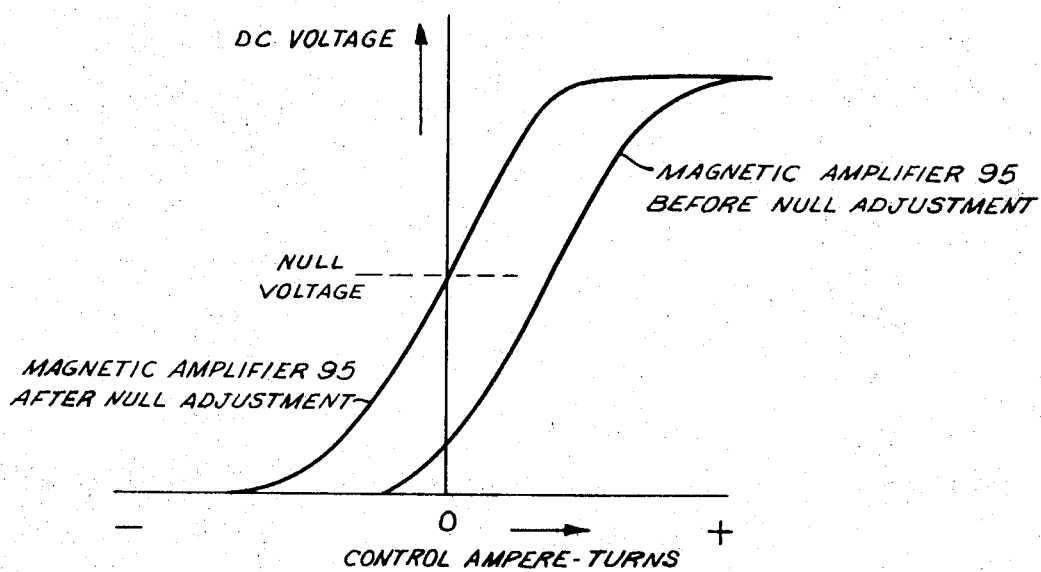
FIG. 12 is a graphical illustration of the null adjustment of the magnetic amplifier of the embodiment of FIG. 4.

FIG. 12 is a graphical illustration of the null adjustment of the magnetic amplifier of the embodiment of FIG. 4. FIG. 12 illustrates the adjustment of the bias winding of the magnetic amplifier 95 of the DC current sensor 26' to have it half on and half off, or so that the voltage across the terminals 126 and 127 is zero when no DC current appears at the resistor 109 of said DC current sensor.

Figure 13:
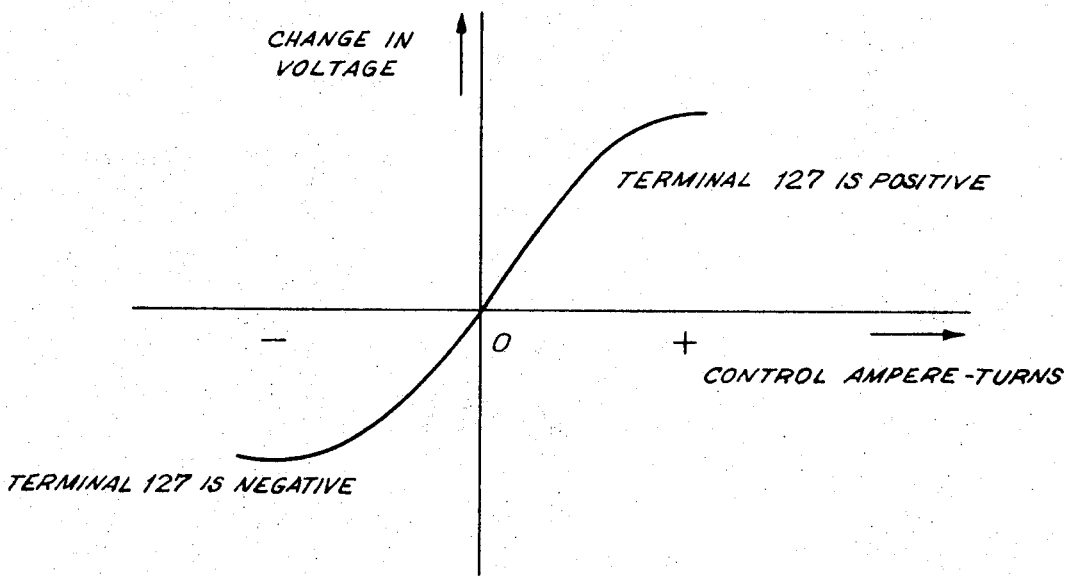
FIG. 13 is a graphical illustration of the voltage produced by the DC current sensor of the embodiment of FIG. 4.

FIG. 13 is a graphical illustration of the voltage produced by the DC current sensor 26' of the embodiment of FIG. 4. FIG. 13 illustrates the voltage across the terminals 126 and 127 of the output bridge 121 as a function of the control ampere-turns of the magnetic amplifier 95. The control ampere-turns are supplied by a resultant DC current in the resistor 109 of the DC current sensor 26'.

Figure 5:
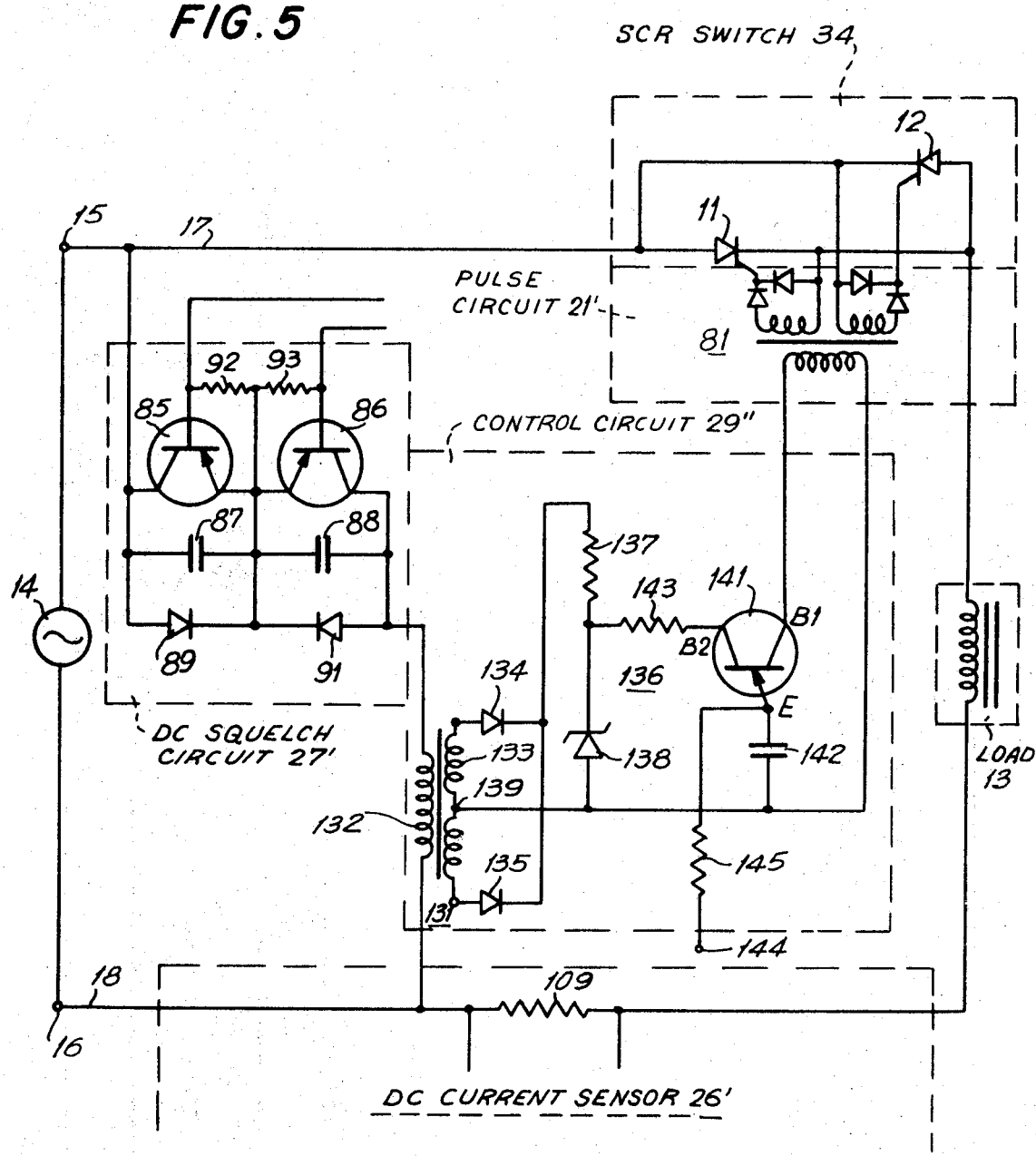
FIG. 5 is a circuit diagram of a portion of a modification of the embodiment of FIG. 4.

FIG. 5 is a modification of the embodiment of FIG. 4. In FIG. 5, the DC squelch circuit 27', the SCR switch 34, the pulse circuit 21', the load 13 and the DC current sensor 26' (not shown in FIG. 5) are the same as the corresponding components of the embodiment of FIG. 4, are interconnected and interrelated the same as in the embodiment of FIG. 4 and function in the same manner as they do in FIG. 4. The modification is in the control circuit.

The control circuit 29'' of the modification of FIG. 5 comprises a transformer 131 having a primary winding 132 connected in the line connecting the anode of the diode 91 of the DC squelch circuit 27' to the supply line 18 and a secondary winding 133. The secondary winding 133 of the transformer 131 is coupled via diodes 134 and 135 to a unijunction pulsing circuit 136 of any suitable type such as, for example, that shown and described on pages 46 and 47 of the Silicon Controlled Rectifier Manual, Second Edition, General Electric Company, 1961.

The output of the transformer 131 is a full wave, rectified, unfiltered DC voltage synchronized with the line voltage of the supply lines 17 and 18 applied at the input terminals 15 and 16 as modified by the operation of the DC squelch circuit 27'. A current limiting resistor 137 is connected in series with a Zener diode 138 between a center tap 139 on the secondary winding of the transformer 131 and the cathodes of the diodes 134 and 135.

The voltage across the Zener diode 138 is applied to the unijunction transistor 141 of the unijunction pulsing circuit 136.

The unijunction transistor 141 comprises a first base B1, a second base B2 and an emitter E. The emitter E of the unijunction transistor 141 is connected to a capacitor 142. A limiting resistor 143 is connected between the second base B2 of the unijunction transistor 141 and a common point on the line joining the current limiting resistor 137 to the Zener diode 138. The primary winding of the pulse transformer 81 of the pulse circuit 21' is connected between the first base B1 of the unijunction transistor 141 and the center tap 139 of the transformer 131.

The emitter E of the unijunction transistor 141 is connected to any suitable regulating circuit via a terminal 144 via a resistor 145 connected to a common point on the line joining the emitter E of said transistor and the capacitor 142. The DC squelch circuit 27' functions to selectively advance and retard alternate pulses supplied to the pulse transformer 81 by the unijunction pulsing circuit 136. When no DC voltage appears across the resistor 109, the unijunction transistor circuit 29'' resets when the source voltage 14 goes through zero. The operation of the DC squelch circuit 27' functions to advance the first half cycle and retard the second half cycle in the manner required to reduce the DC current component.

Figure 6:
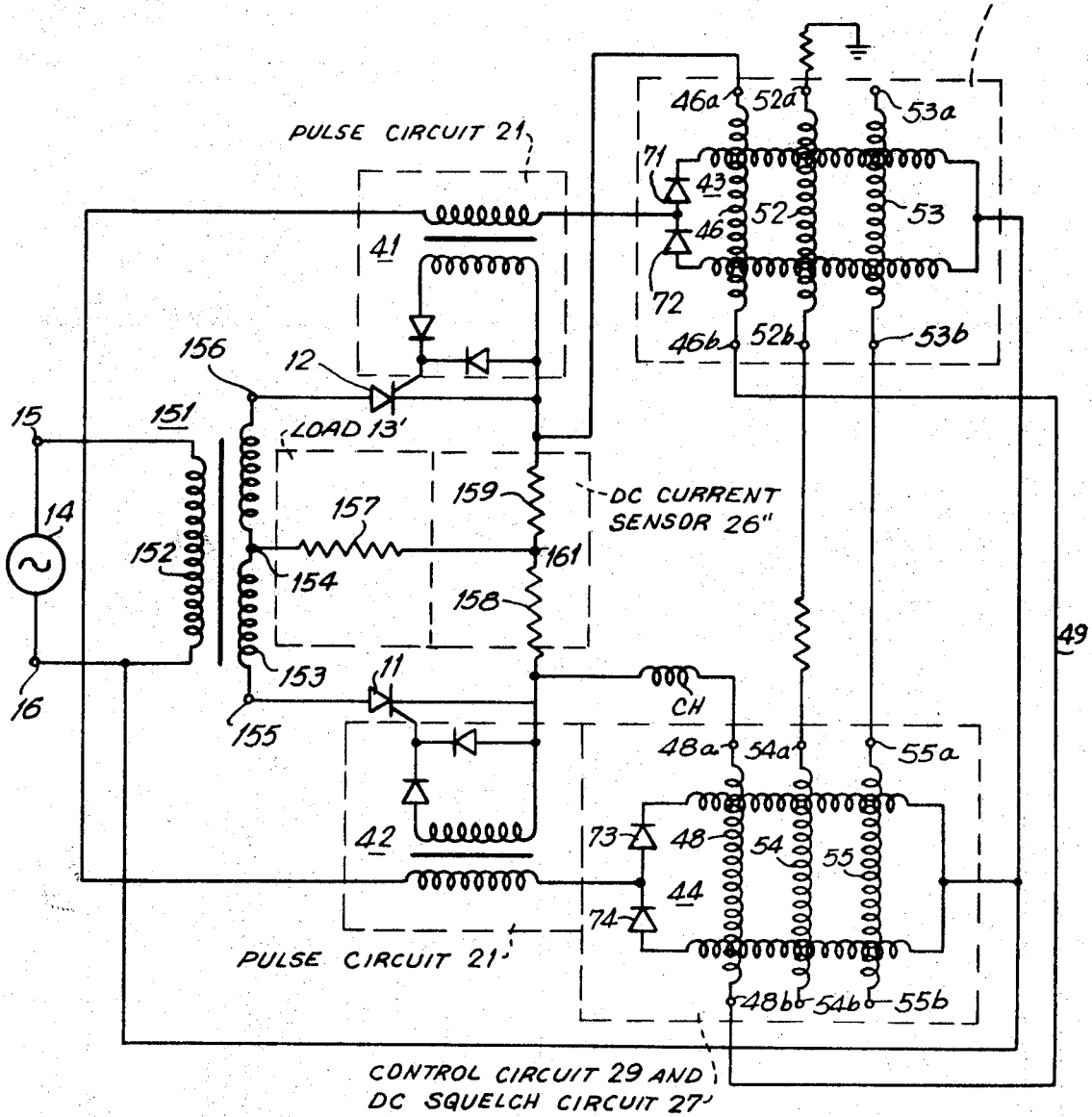
FIG. 6 is a circuit diagram of another embodiment of the DC squelch circuit of the present invention.

FIG. 6 is another embodiment of the DC squelch circuit of the present invention. In the embodiment of FIG. 6, the silicon controlled rectifiers 11 and 12 are connected in the secondary, rather than the primary, circuit as in the hereinbefore described embodiments. In the embodiment of FIG. 6, DC currents cannot be generated in the line, but an unbalance in the time, point or angle of firing of the SCR's can produce currents in the transformer 151 which saturate the core thereof. This produces asymmetrical currents in the primary windings 152 of the transformer 151 and also increases the RMS currents as hereinbefore described.

The transformer 151 comprises a secondary winding 153 having a center tap 154. The anode of the first SCR 11 is connected to an end termnial 155 of the secondary winding 153 of the transformer 151 and the anode of the second SCR 12 is connected to an end terminal 156 of said secondary winding. A DC load 13' comprises a resistor 157 connected to the center tap 154 of the secondary winding 153. A DC current sensor 26'' comprises a resistor 158 connected in series with a resistor 159. The sensor resistors 158 and 159 are connected in series between the cathode of the first and second SCR's 11 and 12, and the load resistor 157 is connected between the center taps 154 of the secondary winding 153 and a common point 161 on the line joining the resistors 158 and 159. The primary winding 152 is connected between the input terminals 15 and 16.

A choke CH is connected between the winding terminal 48a and the sensing resistor 158 of FIG. 6 and functions to filter AC out of the cores of the magnetic amplifiers.

In the embodiment of FIG. 6, all the DC current flows through the load 13' whether it aids in the saturation of the core of the transformer 151 or not. Furthermore, the degree to which a core can be saturated in the circuit of FIG. 6 is not as great as when the SCR's are connected in the primary. This is due to the fact that the magnitude of the DC current which is permitted to flow is limited by the load impedance. When the SCR's are connected in the primary, the amount of DC current which is permitted to flow is limited only by the resistance of the primary circuit and the transformer primary winding. In any event, saturation of the transformer core is undesirable, as in most circuits, especially when very large systems are involved.

In the embodiment of FIG. 6, unbalanced firing of the SCR's 11 and 12 results in a DC voltage, which accompanies an AC voltage, and which appears across the sensor resistors 158 and 159. The control circuit 29 and DC squelch circuit 27 of FIG. 6 is the same as that of FIG. 3 and functions in the same manner and the pulse circuit 21 of FIG. 6 is the same as that of FIG. 3 and functions in the same manner. Thus, any DC voltage appearing across the sensor resistors 158 and 159 will function in the aforedescribed manner to squelch the unbalance DC current, so that if it is assumed that the first SCR 11 conducts for a longer period of time during its half cycle, which period is longer than the corresponding period of conduction of the SCR 12 during its half cycle, a DC voltage is produced across the sensor resistors 158 and 159. The DC voltage across the sensor resitor 158 and 159 has a negative polarity at the winding terminal 46a of the winding 46 of the magnetic amplifier 43. The DC current then flows through the windings 46 and 48 of the magnetic amplifiers 43 and 44, respectively, in such a manner that it advances the point, time or angle of firing of the magnetic amplifier 43 and retards the point, time or angle of firing of the magnetic amplifier 44. This reduces the period of time during which the first SCR 11 conducts in its half cycle and increases the period of time during which the second SCR 12 conducts in its half cycle, in the manner hereinbefore described, and squelches, suppresses or eliminates the DC voltage across the sensor resistors 158 and 159.

FIG. 7 is a three phase DC squelch circuit system utilizing the embodiment of FIG. 1. A source 165 of three phase AC voltage provides three phase AC voltage at input terminals 166, 167 and 168. Each phase of the three phase delta circuit comprises a DC squelch circuit which is the same as the DC squelch circuit of FIG. 1 with the exception that a single control circuit 29 controls the DC squelch circuits of all three phases. Thus, the DC squelch circuit 26a, 27a, 28a, 21a, 32a, 34a of the first phase is the same as the DC squelch circuit 26, 27, 28, 21, 32, 34 of FIG. 1 as are the DC squelch circuit 26b, 27b, 28b, 21b, 32b, 34b of the second phase and the DC squelch circuit 26c, 27c, 28c, 21c, 32c, 34c of the third phase. A three phase AC load 169 is provided. The embodiment of FIG. 7 squelches or suppresses DC currents in any of the three phases.

There is a considerable difference in the possibilities of producing DC current in three phase systems when the silicon controlled rectifiers are in the primary circuit of the transformer and when the silicon controlled rectifiers are in the secondary circuit of the transformer. When the SCR's are in the secondary circuit of a transformer such as, for example, a full wave bridge circuit, how early in the corresponding portion of the cycle each SCR is fired is of little significance, since the SCR's conduct no current until they are ready to commutate. That is, the voltage of the preceding phase in the secondary circuit must first decrease to the voltage of the commutating phase before any current will be permitted to flow in that particular phase. This prevents the production of DC current in such a circuit, since differential pulsing of the SCR's in advance of, or prior to, the commutating instant will produce no DC.

When the SCR's are in the primary circuit of a transformer, the circuit can begin to supply current to the transformer as soon as the SCR's are fired, even at the exact beginning of the corresponding portion of the cycle. Thus, any unbalance in the pulsing of the SCR's, or any occurrence of second harmonics in the lines, even with completely balanced pulses, can produce DC current to saturate the transformer. When the SCR's are in the secondary circuit of a transformer, it is not the fact that no DC can be produced, but rather that DC can be produced only when the SCR's are fired after the instant at which they can commutate.

While the invention has been described by means of specific examples and in specific embodiments, I do not wish to be limited thereto, for obvious modifications will occur to those skilled in the art without departing from the spirit and scope of the invention.

I claim:
1. A DC squelch circuit, comprising
   AC circuit means having AC cycles and including silicon controlled rectifier means;
   pulsing means connected to said silicon controlled rectifier means for firing said silicon controlled rectifier means at predetermined times in the AC cycles, said silicon controlled rectifier means being prone to fire at other than said predetermined times in said cycles thereby producing DC current in said AC circuit means when said silicon controlled rectifier means fires at other than said predetermined times;
   control means connected between said AC circuit means and said pulsing means for controlling the firing times of said silicon controlled rectifier means to fire said silicon controlled rectifier means at said predetermined times in a manner to suppress said DC current; and
   DC current sensing means connected in said AC circuit means and connected to said control means for controlling the operation of said control means.

2. A DC squelch circuit as claimed in claim 1, wherein said pulsing means includes a pair of pulse transformers, said DC current sensing means comprises a resistor, and said squelch circuit further comprising a first magnetic amplifier connected between said resistor and a first of the pulse transformers of said pulsing means and a second magnetic amplifier connected between said resistor and a second of the pulse transformers of said pulsing means.

3. A DC squelch circuit as claimed in claim 2, wherein each of said magnetic amplifiers has a core, and further comprising a choke connected between said resistor and said magnetic amplifiers for filtering AC out of the cores of said magnetic amplifiers.

4. A DC squelch circuit as claimed in claim 2, wherein each of said magnetic amplifiers includes firing control winding means connected to said resistor for determining the firing angle of the corresponding magnetic amplifier, and filter and control winding means connected to the pulse transformers of said pulsing means.

5. A DC squelch circuit as claimed in claim 2, wherein each of said magnetic amplifiers is a self-saturating magnetic amplifier.

6. A DC squelch circuit as claimed in claim 1, wherein said pulsing means includes a pulse transformer, said DC current sensing means includes a resistor and said control means comprises a magnetic amplifier connected between said resistor and the pulse transformer of said pulsing means, and further comprising DC squelching means connected between said DC current sensing means and said control means.

7. A DC squelch circuit as claimed in claim 6, wherein said DC squelching means comprises a symmetrical circuit arrangement including a pair of transistors each having emitter, collector and base electrodes, an emitter-base path and an emitter-collector path, the emitter electrodes of said transistors being connected to each other, a pair of capacitors each connected across the emitter-collector path of a corresponding one of said transistors and a pair of diodes each connected across a corresponding one of said capacitors.

8. A DC squelch circuit as claimed in claim 6, wherein said DC current sensing means comprises another magnetic amplifier connected to said resistor which is half on and half off when no DC voltage appears at said resistor.

9. A DC squelch circuit as claimed in claim 1, wherein said pulsing means includes a pulse transformer, said DC current sensing means includes a resistor and said control means includes a unijunction transistor pulsing circuit connected to the pulse transformer of said pulsing means, and further comprising DC squelching means connected between said resistor and the unijunction transistor pulsing circuit of said control means.

10. A DC squelch circuit as claimed in claim 9, wherein said control means further comprises a Zener diode connected across said unijunction transistor pulsing circuit and inductively coupled to said DC squelching means.

11. A DC squelch circuit as claimed in claim 1, wherein said DC current sensing means comprises a pair of resistors.

12. A DC squelch circuit as claimed in claim 2, wherein said AC circuit means comprises a three phase circuit having three circuit branches, each of said three circuit branches including corresponding DC sensing means connected in the corresponding circuit branch, corresponding pulsing means and corresponding DC squelching means connected between said DC current sensing means and the corresponding pulsing means, said control means being common to said three circuit branches and connected to the DC squelching means of each of said circuit branches.

References Cited

UNITED STATES PATENTS

| | | | |
|---|---|---|---|
| 2,920,240 | 1/1960 | Macklem | 307—252 XR |
| 2,987,666 | 6/1961 | Manteuffel | 307—252 XR |
| 2,998,547 | 8/1961 | Berman | 307—252 XR |
| 3,193,725 | 7/1965 | Skirpan | 307—252 XR |
| 3,217,239 | 11/1965 | Lunney | 307—252 XR |

DONALD D. FORRER, Primary Examiner

J. ZAZWORSKY, Assistant Examiner

U.S. Cl. X.R.

307—202; 315—196, 251; 323—24, 34